3,244,717
5-HYDROXY-2-METHYL-7-PHENYLIMIDAZO[1,2-a]
PYRIMIDINES
Hans A. Wagner, Skokie, Ill., assignor to G. D. Searle &
Co., Chicago, Ill., a corporation of Delaware
No Drawing. Filed June 18, 1964, Ser. No. 376,248
7 Claims. (Cl. 260—256.4)

This invention relates to 5-hydroxy-2-methyl-7-phenyl-imidazo[1,2-a]pyrimidines and processes for the preparation thereof. More particularly, this invention provides novel, useful, and unobvious chemical compounds of the formula

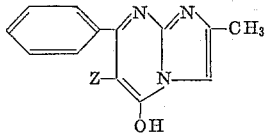

wherein Z represents hydrogen or an alkyl, alkenyl, alkynyl, alkoxyalkyl, or acetonyl radical.

Among the alkyl radicals represented by Z, especially lower alkyl radicals are preferred, which is to say methyl, ethyl, propyl, isopropyl, butyl, isobutyl, sec-butyl, tert-butyl, pentyl, neopentyl, hexyl, isohexyl, heptyl, and like monovalent, saturated, acyclic, straight- or branched-chain, hydrocarbon groupings of the formula —$C_nH_{2n+1}$ wherein $n$ represents a positive integer less than 8.

The alkenyl and alkynyl radicals represented by Z are such as vinyl, ethynyl, allyl, propenyl, propynyl (1- or 2-), 2-methylpropenyl, methylallyl, butenyl (1-, 2-, or 3-), butynyl (1-, 2-, or 3-), and like monovalent, acyclic, straight- or branched-chain, hydrocarbon groupings containing either a double or triple bond and having the formulas —$C_aH_{2a-1}$ and —$C_bH_{2b-3}$ wherein $a$ and $b$ represent positive integers greater than 1 and ordinarily less than 5.

The alkoxyalkyl radicals represented by Z are desirably those of the formula

—$C_nH_{2n}$—O—$C_nH_{2n+1}$ wherein $n$ is defined as before, among which the ethoxyethyl radical is a grouping of choice.

The compounds to which this invention relates are characterized by valuable pharmacological properties. Thus, for example, they are anti-hypertensive, promote diuresis (both directly and by blocking the effect of desoxycorticosterone acetate on urinary sodium and potassium), inhibit exogenously-induced hypercholesterolemia, and are anti-biotics effective against *Chlorella vulgaris*.

Preparation of the compounds hereof proceeds by heating an appropriate 2-amino-6-phenylpyrimidin-4(3H)-one of the formula

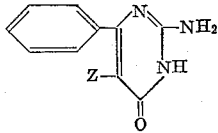

(Z being defined as before) with chloro-2-propanone in dimethylformamide. Alternatively, an appropriate 2-amino-6-phenyl-3-(2-propynyl)pyrimidin-4(3H)-one

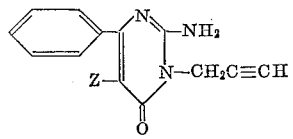

(Z again being defined as before) is heated with mercuric sulfate in aqueous acetic acid containing sulfuric acid. Note, however, that when Z in the latter formula represents a 2-propynyl grouping, the product is 6-acetonyl-5-hydroxy-2-methyl-7-phenylimidazo[1,2-a]pyrimidine.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

A. *2 - amino - 6 - phenyl - 3 - (2 - propynyl)pyrimidin-4(3H)-one.*—To a solution of 38 parts of 2-amino-6-phenylpyrimidin-4(3H)-one in a solution of 15 parts of sodium methoxide in 500 parts of methanol is added a solution of 36 parts of propargyl bromide in 100 parts of methanol. The resultant mixture is heated at the boiling point with agitation under reflux for 16 hours, whereupon the methanol is removed by vacuum distillation and the residue diluted with a solution of 10 parts of sodium hydroxide in 1000 parts of water. The mixture thus obtained is stirred for ½ hour, at which point insoluble solids are filtered off, washed to neutrality on the filter with water, dried in air, and recrystallized from methanol. The material thus isolated is 2-amino-6-phenyl-3-(2-propynyl)pyrimidin-4(3H)-one melting at 212–214°.

B. *5 - hydroxy - 2 - methyl - 7 - phenylimidazo[1,2-a]pyrimidine.* — To a solution of 10 parts of 2-amino-6-phenyl-3-(2-propynyl)pyrimidin-4(3H)-one and 2 parts of concentrated sulfuric acid in 50 parts of aqueous 65% acetic acid is added a solution of 1 part of mercuric sulfate, 8 parts of water, and 1 part of concentrated sulfuric acid in 50 parts of aqueous 65% acetic acid. The resultant mixture is heated at 80° for 4 hours, then poured into 500 parts of cold water. The mixture thus obtained is neutralized with aqueous sodium hydroxide, whereupon the insoluble solids are filtered off, washed on the filter with water, dried in air, and recrystallized from ethanol to give 5-hydroxy-2-methyl - 7 - phenylimidazo[1,2-a]pyrimidine melting above 300°. The product has the formula

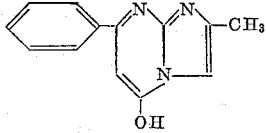

Example 2

*5 - hydroxy - 2,6 - dimethyl - 7 - phenylimidazo[1,2-a] pyrimidine.*—A solution of 10 parts of 2-amino-5-methyl-6-phenylpyrimidin-4(3H)-one and 5 parts of chloro-2-propanone in 100 parts of dimethylformamide is heated at the boiling point under reflux in an atmosphere of nitrogen for 8 hours, then cooled and poured into 500 parts of aqueous 3% sodium hydroxide. The resultant mixture is treated with decolorizing charcoal, filtered, and neutralized with acetic acid. Insoluble solids are thereupon filtered off, washed with water, dried in air, and recrystallized from ethanol to give 5-hydroxy-2,6-dimethyl-7-phenylimidazo[1,2-a]pyrimidine melting above 300°. The product has the formula

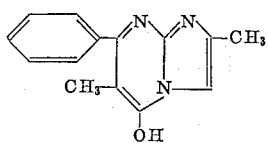

Example 3

*6 - allyl - 5 - hydroxy - 2 - methyl - 7 - phenylimidazo [1,2-a]pyrimidine.*—Substitution of 12 parts of 5-allyl-2-amino-6-phenylpyrimidin-4(3H)-one for the 2-amino-5-methyl-6-phenylpyrimidin-4(3H)-one called for in Example 2 affords, by the procedure there detailed, 6-allyl-5 - hydroxy - 2 - methyl - 7 - phenylimidazo[1,2 - a]pyrimidine melting at approximately 253–254°. The product has the formula

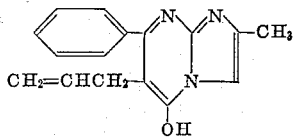

Example 4

*5 - hydroxy - 2 - methyl - 7 - phenyl - 6 - (2 - propynyl) imidazo[1,2-a]pyrimidine.*—Substitution of 11 parts of 2 - amino - 6 - phenyl - 5 - (2 - propynyl)pyrimidin - 4 (3H)-one for the 2-amino-5-methyl-6-phenylpyrimidin-4(3H)-one called for in Example 2 affords, by the procedure there detailed, 5-hydroxy-2-methyl-7-phenyl-6-(2-propynyl)imidazo[1,2-a]pyrimidine melting at approximately 281–282° with decomposition. The product has the formula

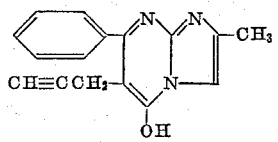

Example 5

A. *Ethyl α-(ethoxyethyl)benzoylacetate.*—A solution of 192 parts of ethyl benzoylacetate in a solution of 23 parts of sodium in 500 parts of anhydrous ethanol is heated to the boiling point with agitation during 30 minutes, following which a solution of 168 parts of 2-bromoethyl ethyl ether in 250 parts of anhydrous ethanol is added at the boiling point over a period of 2 hours. The resultant mixture is heated at the boiling point under reflux for 16 hours, then chilled and filtered. Ethanol is thereupon removed by vacuum distillation and 1000 parts of pentane added to the residue. The resultant mixture is filtered, freed of pentane by distillation, and fractionally distilled in vacuo. The material coming over at approximately 139–140° under 0.1 mm. pressure is the desired ethyl α-(ethoxyethyl)benzoylacetate.

B. *2 - amino - 5 - ethoxyethyl - 6 - phenylpyrimidin-4(3H)-one.*—A mixture of 78 parts of ethyl α-(ethoxyethyl)benzoylacetate, 48 parts of guanidine carbonate, and 600 parts of anhydrous ethanol is heated at the boiling point under reflux with agitation for 24 hours. The ethanol is thereupon removed by vacuum distillation. Approximately 1500 parts of water is then mixed in, followed by sufficient glacial acetic acid to neutralize the alkalinity. The insoluble solids thrown down are filtered off and consecutively washed with water, acetone, and ether. The product thus isolated is 2-amino-5-ethoxyethyl-6-phenylpyrimidin-4(3H)-one melting at approximately 288°.

C. *6 - ethoxyethyl - 5 - hydroxy - 2 - methyl - 7 - phenylimidazo[1,2-a]pyrimidine.*—Substitution of 13 parts of 2-amino-5-ethoxyethyl-6-phenylpyrimidin-4(3H)-one for the 2 - amino - 5 - methyl - 6 - phenylpyrimidin - 4(3H)-one called for in Example 2 affords, by the procedure there detailed, 6-ethoxyethyl-5-hydroxy-2-methyl-7-phenylimidazo[1,2-a]pyrimidine melting at approximately 238–239°. The product has the formula

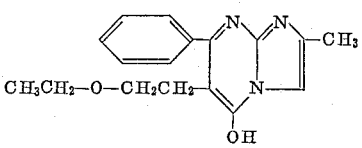

Example 6

*6 - acetonyl - 5 - hydroxy - 2 - methyl - 7 - phenylimidazo[1,2-a]pyrimidine.*—To a solution of 4 parts of 2 - amino - 5 - phenyl - 3,5 - di - (2 - propynyl)pyrimidin-4(3H)-one in 50 parts of aqueous 65% acetic acid containing 2 parts of concentrated sulfuric acid is added a solution of 1 part of mercuric sulfate, 8 parts of water, and 1 part of concentrated sulfuric acid in 50 parts of aqueous 65% acetic acid. The resultant mixture is heated at 80° for 4 hours, then poured into 500 parts of cold water. The mixture thus obtained is neutralized with aqueous sodium hydroxide, whereupon insoluble solids are filtered off, washed on the filter with water, dried in air, and recrystallized from ethanol to give 6-acetonyl-5-hydroxy - 2 - methyl - 7 - phenylimidazo[1,2 - a]pyrimidine melting at 276–278° with decomposition. The product has the formula

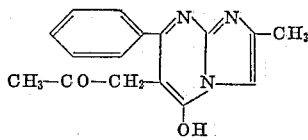

What is claimed is:

1. A compound of the formula

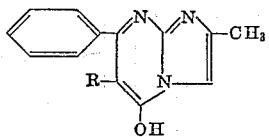

wherein R represents a member of the class consisting of hydrogen and methyl, allyl, propynyl, ethoxyethyl, and acetonyl radicals.

2. 5 - hydroxy - 2 - methyl - 7 - phenylimidazo[1,2-a] pyrimidine.

3. 5 - hydroxy - 2,6 - dimethyl - 7 - phenylimidazo [1,2-a]pyrimidine.

4. 6 - allyl - 5 - hydroxy - 2 - methyl - 7 - phenylimidazo[1,2-a]pyrimidine.

5. 5 - hydroxy - 2 - methyl - 7 - phenyl - 6 - (2 - propynyl)imidazo[1,2-a]pyrimidine.

6. 6 - ethoxyethyl - 5 - hydroxy - 2 - methyl - 7 - phenylimidazo[1,2-a]pyrimidine.

7. 6 - acetonyl - 5 - hydroxy - 2 - methyl - 7 - phenylimidazo[1,2-a]pyrimidine.

No references cited.

NICHOLAS S. RIZZO, *Primary Examiner.*

MARY O'BRIEN, *Examiner.*